(12) United States Patent
Tamura et al.

(10) Patent No.: US 10,047,444 B2
(45) Date of Patent: Aug. 14, 2018

(54) METHOD FOR GENERATING HYDROGEN AND HYDROGEN GENERATION DEVICE USED THEREFOR

(71) Applicant: Panasonic Intellectual Property Management Co., Ltd., Osaka (JP)

(72) Inventors: Satoru Tamura, Osaka (JP); Kazuhito Hato, Osaka (JP); Takaiki Nomura, Osaka (JP); Takahiro Kurabuchi, Osaka (JP); Yoshihiro Kozawa, Osaka (JP); Ryousuke Kikuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 59 days.

(21) Appl. No.: 14/810,201

(22) Filed: Jul. 27, 2015

(65) Prior Publication Data

US 2015/0329976 A1 Nov. 19, 2015

Related U.S. Application Data

(63) Continuation of application No. PCT/JP2014/002187, filed on Apr. 17, 2014.

(30) Foreign Application Priority Data

Apr. 26, 2013 (JP) .................. 2013-093530

(51) Int. Cl.
*C25B 1/00* (2006.01)
*C25B 1/04* (2006.01)
(Continued)

(52) U.S. Cl.
CPC ............. *C25B 1/003* (2013.01); *B01J 35/004* (2013.01); *B01J 35/0033* (2013.01);
(Continued)

(58) Field of Classification Search
CPC ....... C25B 1/003; C25B 11/0478; C25B 1/04; C25B 11/0405; C25B 11/04;
(Continued)

(56) References Cited

U.S. PATENT DOCUMENTS 4,656,103 A * 4/1987 Reichman ............... C25B 1/003
205/340
2004/0262154 A1* 12/2004 Gibson ................... C25B 1/003
204/280

(Continued)

FOREIGN PATENT DOCUMENTS

CN 102713010 10/2012
JP 9-234374 9/1997
(Continued)

OTHER PUBLICATIONS

Derwent abstract of DE102012003597 (Aug. 2013) (Year: 2013).*
(Continued)

*Primary Examiner* — Ibrahime A Abraham
*Assistant Examiner* — Colleen M Raphael
(74) *Attorney, Agent, or Firm* — McDermott Will & Emery LLP

(57) ABSTRACT

Provided is a method for generating hydrogen. The method comprising (a) preparing a hydrogen generation device comprising a container, a photo-semiconductor electrode comprising a substrate, a light-blocking first conductive layer, and a first semiconductor photocatalyst layer, a counter electrode, a conductive wire for electrically connecting the first conductive layer to the counter electrode, and a liquid stored in the container, and (b) irradiating the first semiconductor photocatalyst layer with light to generate hydrogen on the counter electrode. The first conductive layer is interposed between the substrate and the first semiconductor photocatalyst layer. At least a part of the first semi-
(Continued)

conductor photocatalyst layer is in contact with the liquid. At least a part of the counter electrode is in contact with the liquid. The liquid is selected from the group consisting of an electrolyte aqueous solution and water. The substrate is formed of a resin.

19 Claims, 13 Drawing Sheets

(51) Int. Cl.
*B01J 35/00* (2006.01)
*C25B 11/04* (2006.01)
*B01J 37/34* (2006.01)
*B01J 23/20* (2006.01)
*B01J 37/02* (2006.01)

(52) U.S. Cl.
CPC ............. *B01J 37/0244* (2013.01); *C25B 1/04* (2013.01); *C25B 11/04* (2013.01); *C25B 11/0405* (2013.01); *C25B 11/0478* (2013.01); *B01J 23/20* (2013.01); *B01J 37/34* (2013.01); *B01J 37/347* (2013.01); *B01J 37/349* (2013.01); *Y02E 60/364* (2013.01); *Y02E 60/368* (2013.01)

(58) Field of Classification Search
CPC .. B01J 35/0033; B01J 37/0244; B01J 35/004; B01J 37/349; B01J 37/34; B01J 23/20; B01J 37/347

USPC ......................................................... 205/340
See application file for complete search history.

(56) References Cited

U.S. PATENT DOCUMENTS

| | | | |
|---|---|---|---|
| 2005/0059186 A1* | 3/2005 | Kelly | ...................... C25B 1/003 204/242 |
| 2005/0211290 A1* | 9/2005 | Deng | ...................... C25B 1/003 136/252 |
| 2009/0060804 A1 | 3/2009 | Oi et al. | |
| 2012/0276464 A1 | 11/2012 | Kuroha et al. | |
| 2012/0285823 A1 | 11/2012 | Suzuki et al. | |
| 2013/0105306 A1 | 5/2013 | Sonoda et al. | |
| 2016/0160364 A1* | 6/2016 | Juluri | ...................... C01B 3/042 205/91 |

FOREIGN PATENT DOCUMENTS

| | | |
|---|---|---|
| JP | 2006-297300 | 11/2006 |
| WO | 2011/058723 | 5/2011 |
| WO | 2011/089904 | 7/2011 |
| WO | 2011/162372 | 12/2011 |

OTHER PUBLICATIONS

International Search Report of PCT application No. PCT/JP2014/002187 dated Jul. 29, 2014.
English Translation of Chinese Search Report dated May 26, 2016 for the related Chinese Patent Application No. 201480004958.6.

\* cited by examiner

METHOD FOR GENERATING HYDROGEN AND HYDROGEN GENERATION DEVICE USED THEREFOR

This is a continuation of International Application No. PCT/JP2014/002187, with an international filing date of Apr. 17, 2014, which claims priority of Japanese Patent Application No. 2013-093530, filed on Apr. 26, 2013, the contents of which are hereby incorporated by reference.

BACKGROUND

1. Technical Field

The present invention relates to a method for generating hydrogen and a hydrogen generation device used therefor.

2. Description of the Related Art

In order to solve increasingly serious environmental problems and energy problems for a sustainable society, it is required to put renewable energy into practical use on a full scale. Recently, a system for storing an electric power generated by a solar cell in a secondary battery has been widely used. However, it is not easy to move a secondary battery due to its weight. For this reason, hydrogen is expected to be used as an energy medium in the future. The advantage of hydrogen as an energy medium is now described below. First, hydrogen is easy to be stored. It is also easy to transfer a tank containing hydrogen. Next, a final product generated after hydrogen is combusted is water, which is harmless, safe, and clean. Furthermore, hydrogen is supplied to a fuel cell to convert it into electric power and heat. Lastly, hydrogen is formed inexhaustible in water splitting.

For this reason, a technology for generating hydrogen by splitting water photoelectrochemically using photocatalyst and sunlight has attractiveness, since sunlight is converted easily into an easy-to-use energy medium using the technology. Research and development has been promoted to improve generation efficiency of hydrogen.

US Pre-Grant Patent Application Publication No. 2012/0285823 discloses a hydrogen generation device. As shown in FIG. 15, the hydrogen generation device 100 disclosed in US Pre-Grant Patent Application Publication No. 2012/0285823 comprises: a transparent substrate 1; a photocatalyst electrode 4 arranged on the transparent substrate 1 and composed of a transparent conductive layer 2 and a photocatalyst layer 3; a counter electrode 8 electrically connected to the transparent conductive layer 2; an electrolytic solution layer arranged between the photocatalyst electrode 3 and the counter electrode 8 and containing water; a separator 6 for dividing the electrolytic solution layer into a first electrolytic solution layer 5 that is in contact with the photocatalyst electrode 4 and a second electrolytic solution layer 7 that is in contact with the counter electrode 8; a first gas outlet 14 for removing a gas generated in the inside of the first electrolytic solution layer 5; and a second gas outlet 15 for removing a gas generated in the inside of the second electrolytic solution layer 7. The photocatalyst electrode 4 and the counter electrode 8 are so arranged that the surface of the photocatalyst layer 3 and the surface of the counter electrode 8 face each other. The separator 6 is so adapted that an electrolyte contained in the electrolytic solution layer can permeate through the separator 6 and a hydrogen gas and an oxygen gas contained in the electrolytic solution layer cannot permeate through the separator 6. According to the paragraph [0022] on US Pre-Grant Patent Application Publication No. 2012/0285823, an example of the transparent substrate 1 is glass or resin.

SUMMARY

The present invention provides a method for generating hydrogen, the method comprising:
(a) preparing a hydrogen generation device comprising:
  a container;
  a photo-semiconductor electrode comprising a substrate, a light-blocking first conductive layer, and a first semiconductor photocatalyst layer;
  a counter electrode;
  a conductive wire for electrically connecting the first conductive layer to the counter electrode; and
  a liquid stored in the container,
  wherein
  the first conductive layer is interposed between the substrate and the first semiconductor photocatalyst layer;
  at least a part of the first semiconductor photocatalyst layer is in contact with the liquid;
  at least a part of the counter electrode is in contact with the liquid;
  the liquid is selected from the group consisting of an electrolyte aqueous solution and water;
  the substrate is formed of a resin; and
  the substrate has a thickness of not less than 0.1 millimeter and not more than 5 millimeters; and
(b) irradiating the first semiconductor photocatalyst layer with light to generate hydrogen on the counter electrode.

The present invention provides a method for generating hydrogen without deteriorating a substrate.

DETAILED DESCRIPTION OF THE EMBODIMENT

Figure 15:
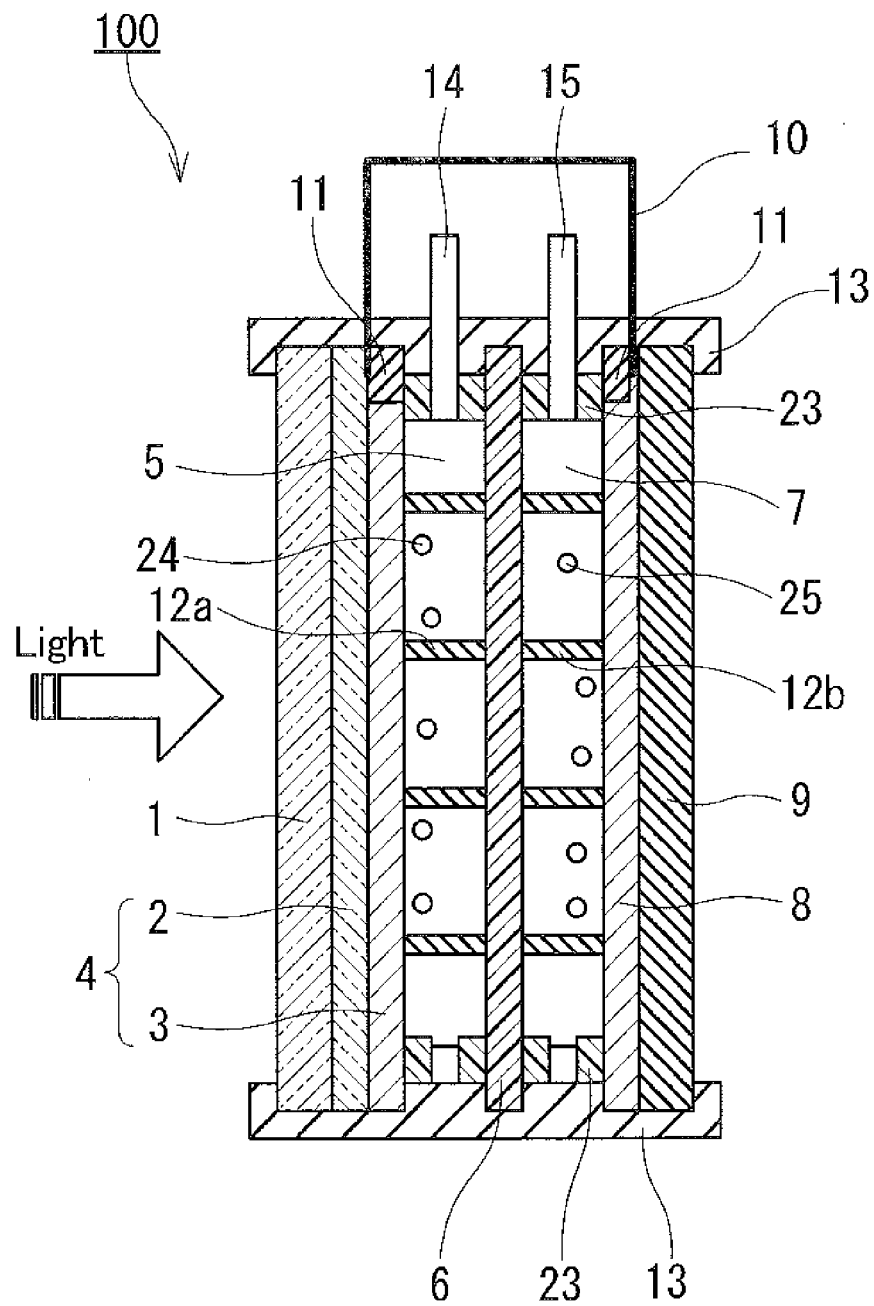
FIG. 15 shows a duplicate of FIG. 1 included in US Pre-Grant Patent Application Publication No. 2012/0285823.

As shown in FIG. 15, the transparent substrate 1 constitutes a part of the container of the hydrogen generation device 100. The light reaches the photocatalyst electrode 3 through the transparent substrate 1. For this reason, the transparent substrate 1 may be deteriorated by the light in the case where the transparent substrate 1 is formed of a resin.

Furthermore, since the light reaches the photocatalyst electrode 3 through the transparent substrate 1, the conductive layer 2 interposed between the transparent substrate 1 and the photocatalyst electrode 3 is required to be transparent. For this reason, it is difficult to form the conductive layer 2 from a metal.

An object of the present invention is to provide a method for generating hydrogen without deteriorating a substrate.

The embodiment of the present invention will be described below with reference to the drawings.

First Embodiment

Figure 9:
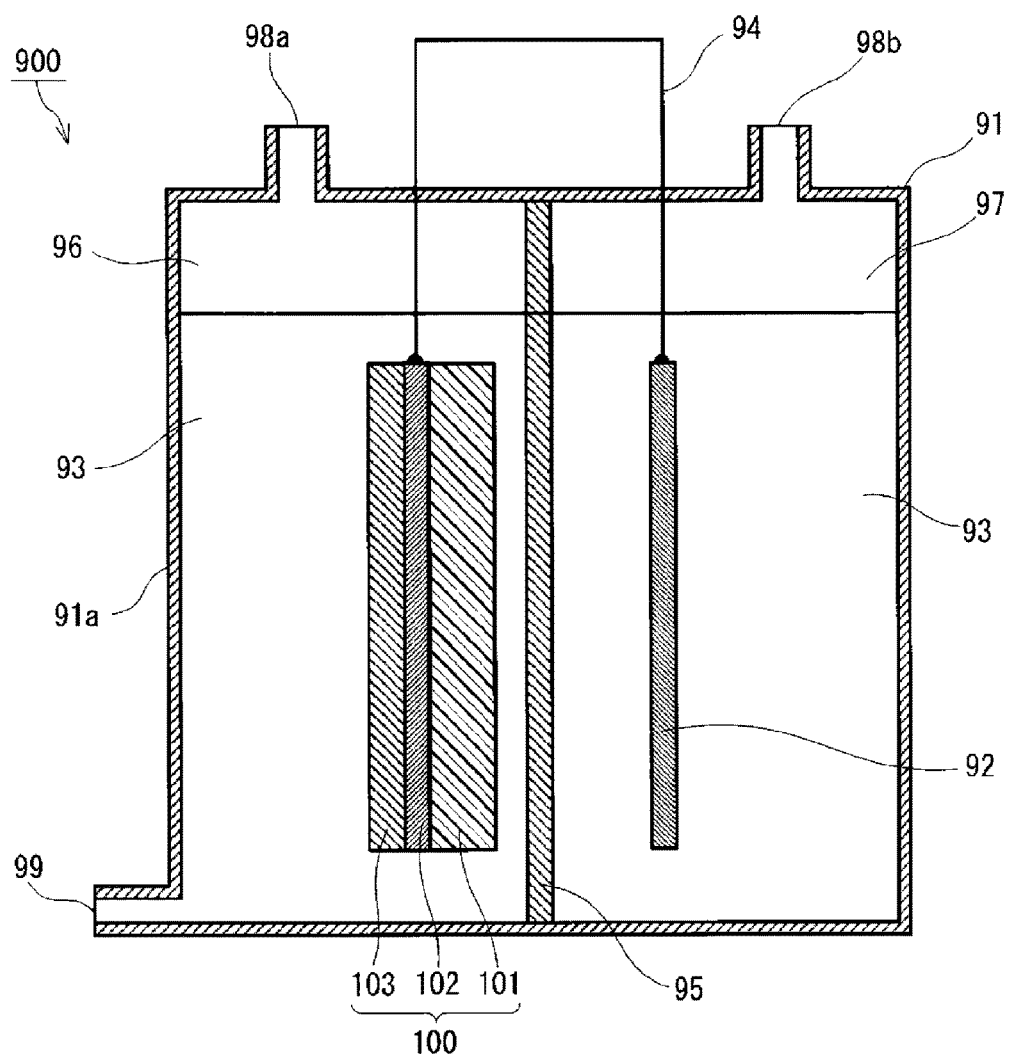
FIG. 9 shows a cross-sectional view of a hydrogen generation device according to the first embodiment.

FIG. 9 shows a cross-sectional view of a hydrogen generation device 900 according to the first embodiment. The hydrogen generation device 900 comprises a container 91, a photo-semiconductor electrode 100 contained in the container 91, and a counter electrode 92 contained in the container 91, as shown in FIG. 9. The photo-semiconductor electrode 100 comprises a substrate 101, a light-blocking first conductive layer 102, and a first semiconductor photocatalyst layer 103. The first conductive layer 102 is interposed between the substrate 101 and the first semiconductor photocatalyst layer 103. Desirably, the inside of the container 91 is divided into a first chamber 96 and a second chamber 97 by a separator 95. Desirably, the photo-semiconductor electrode 100 and the counter electrode 92 are contained in the first chamber 96 and the second chamber 97, respectively. A liquid 93 is stored in the container 91. Desirably, the liquid 93 is stored in the first chamber 96 and the second chamber 97. The liquid 93 is water or an electrolyte aqueous solution. An example of the electrolyte aqueous solution is dilute sulfuric acid, a sodium carbonate aqueous solution, a sodium sulfate aqueous solution, a sodium hydroxide aqueous solution, or a potassium hydroxide aqueous solution.

In the first chamber 96, the photo-semiconductor electrode 100 is in contact with the liquid 93. Desirably, at least a part of the photo-semiconductor electrode 100 is immersed in the liquid 93. More desirably, the whole of the photo-semiconductor electrode 100 is immersed in the liquid 93.

The first chamber 96 comprises a first outlet 98a and a water supply inlet 99. Oxygen generated in the first chamber 96 is exhausted through the first outlet 98a. Water is supplied through the water supply inlet 99 to the first chamber 96. Desirably, at least a part of the container 91 is composed of a light-transmissive part 91a. The light-transmissive part 91a faces the first semiconductor photocatalyst layer 103. Light such as sunlight reaches the first semiconductor photocatalyst layer 103 through the light-transmissive part 91a. An example of a material of the container 91 is Pyrex (registered trademark) glass or an acrylic resin. The photo-semiconductor electrode 100 is perpendicular to the liquid level of the liquid 93. The light-transmissive part 91a is also perpendicular to the liquid level of the liquid 93.

Figure 12:
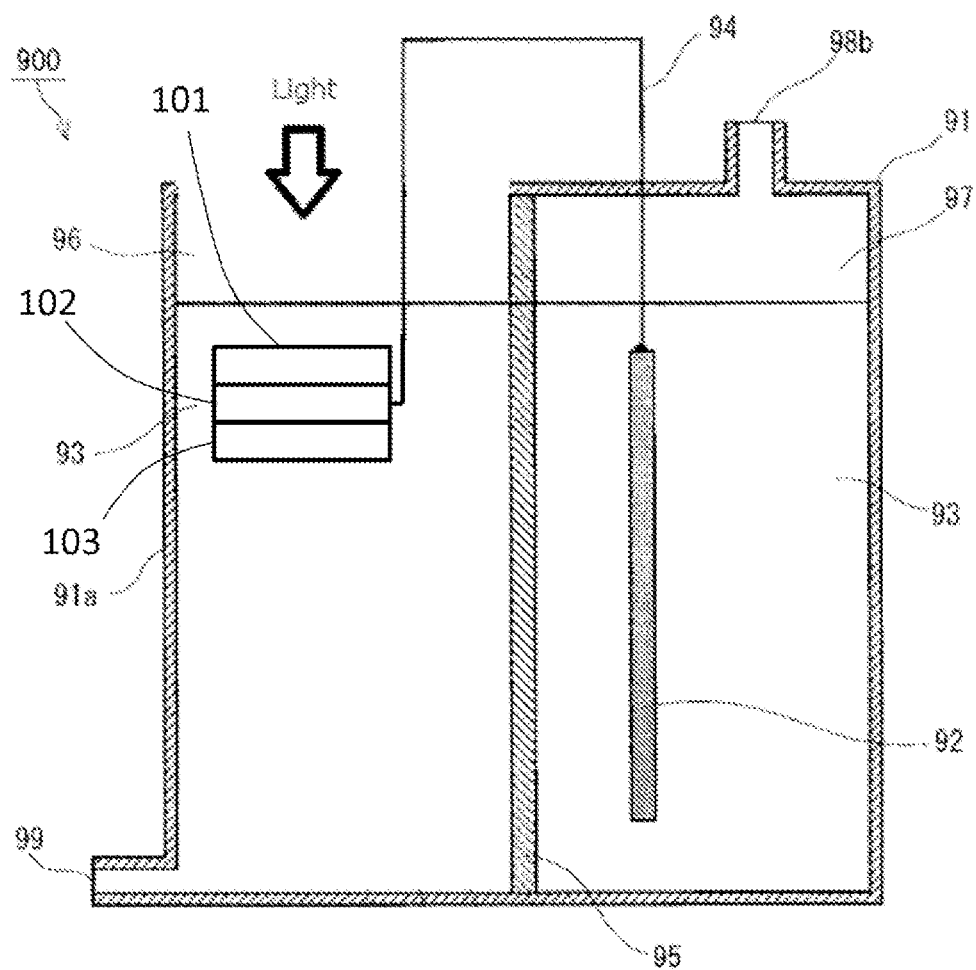
FIG. 12 shows a cross-sectional view of another hydrogen generation device.

As shown in FIG. 12, the light-transmissive part 91a may be omitted. In this case, it is desirable that the photo-semiconductor electrode 100 is immersed in the liquid 93 in such a manner that the photo-semiconductor electrode 100 having a shape of a plate is parallel to the liquid level of the liquid 93.

In the second chamber 97, the counter electrode 92 is in contact with the liquid 93. Desirably, at least a part of the counter electrode 92 is immersed in the liquid 93. More desirably, the whole of the counter electrode 92 is immersed in the liquid 93. The second chamber 97 comprises a second outlet 98b. Hydrogen generated in the second chamber 97 is exhausted from the second outlet 98b.

The first conductive layer 102 is electrically connected to the counter electrode 92 through a conductive wire 94.

The counter electrode 92 means an electrode for receiving electrons from the photo-semiconductor electrode 100 without an electrolyte solution. The positional relationship between the counter electrode 92 and the photo-semiconductor electrode 100 is not limited, as long as the counter electrode 92 is electrically connected to the first conductive layer 102.

The liquid 93 is water or an electrolyte aqueous solution. An electrolyte aqueous solution is desirable. The electrolyte aqueous solution is acid or alkaline. The liquid 93 may be always stored in the container 91. Alternatively, the liquid 93 may be supplied only in operation of the hydrogen generation device 900.

The separator 95 is formed of a material capable of transporting the liquid 93 thereacross; however, capable of blocking gases generated in the first chamber 96 and the second chamber 97. In other words, the liquid 93 can go through the separator 95; however, a gas is prevented from going through the separator 95. An example of the material of the separator 95 is a solid electrolyte such as a solid polymer electrolyte. An example of the solid polymer electrolyte is an ion exchange membrane such as Nafion (registered trademark). The separator 95 as described above divides the inside of the container 91 into the first chamber 96 and the second chamber 97 to easily separate hydrogen generated in the second chamber 97 from oxygen generated in the first chamber 96.

The first conductive layer 102 is electrically connected to the counter electrode 92 through the conductive wire 94. Electrons generated in the photo-semiconductor electrode 100 are transferred to the counter electrode 92 through the conductive wire 94.

Figure 1:
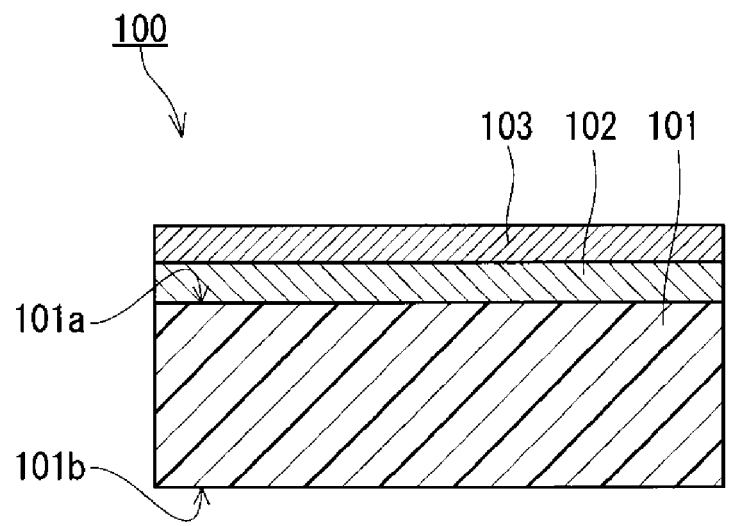
FIG. 1 shows a cross-sectional view of a photo-semiconductor electrode which can be used in a first embodiment.

FIG. 1-FIG. 8 show cross-sectional views of the photo-semiconductor electrode 100 used for the hydrogen generation device 900. First, the photo-semiconductor electrode 100 shown in FIG. 1 will be described. The photo-semiconductor electrode 100 comprises a substrate 101, a first conductive layer 102, and a first semiconductor photocatalyst layer 103, as shown in FIG. 1. The substrate 101 is formed of a resin. The substrate 101 has a first principal plane 101a and a second principal plane 101b. The first principal plane 101a is the front surface of the substrate 101. The second principal plane 101b is the back surface of the substrate 101. The first conductive layer 102 is disposed on the first principal plane 101a of the substrate 101. The first semiconductor photocatalyst layer 103 is disposed on the first conductive layer 102. Since the substrate 101 is formed of a resin, the substrate 101 weighs less than a substrate formed of a metal. Furthermore, the substrate 101 formed of a resin is available at lower cost than a substrate formed of a metal. Thus, since the substrate 101 formed of a resin is light-weight, the hydrogen generation device 900 comprising the substrate 101 formed of a resin can be set on a roof of a building structure.

An example of a material of the substrate 101 is polyethylene, polypropylene, polyvinyl chloride, polystyrene, polymethyl methacrylate, polyamide, polycarbonate, polybutylene terephthalate, or polyethylene terephthalate. In light of the property of the photo-semiconductor electrode 100, it is desirable that the substrate 101 is formed of a material having a small specific gravity, a high strength, small hygroscopicity, high chemical resistance, high impact resistance, high weather resistance, and high heat resistance.

The substrate 101 supports the first conductive layer 102 and the first semiconductor photocatalyst layer 103. As a result, the substrate 101 maintains the shape of the photo-semiconductor electrode 100. The substrate 101 has a mechanical strength enough to support the whole of the photo-semiconductor electrode 100 and to maintain the shape thereof. The thickness of the substrate 101 having such a mechanical strength varies depending on the material used for the substrate 101. As one example, the substrate 101 has a thickness of not less than 0.1 millimeter. On the other hand, in light of the weight of the photo-semiconductor electrode 100, it is desirable that the substrate 101 has a thickness of not more than 5 millimeters.

The first conductive layer 102 is formed of a metal. Desirably, the first conductive layer 102 includes at least one element selected from the group consisting of Al, Ti, V, Zr, Nb and Ta. Desirably, the first conductive layer 102 has a thickness of not less than 0.01 micrometer and not more than 1 micrometer. More desirably, the first conductive layer 102 has a thickness of not less than 0.05 micrometer and not more than 1 micrometer.

Besides, it is desirable that the first conductive layer 102 is formed of a material capable of forming an ohmic contact between the first conductive layer 102 and the first semiconductor photocatalyst layer 103. The migration of electrons between a semiconductor layer and a metal layer is prevented due to Schottky barrier which is formed therebetween. However, when the first semiconductor photocatalyst layer 103 and the first conductive layer 102 form an ohmic contact, Schottky barrier is not generated. Therefore, electrons are not prevented from migrating from the first semiconductor photocatalyst layer 103 to the first conductive layer 102. In other words, when the first semiconductor photocatalyst layer 103 and the first conductive layer 102 form an ohmic contact, electrons migrate easily from the first semiconductor photocatalyst layer 103 to the first conductive layer 102. For this reason, efficiency of the charge separation is improved to decrease the probability of the recombination of electrons and holes. As a result, quantum efficiency of the photo-semiconductor electrode 100 is improved. When the first semiconductor photocatalyst layer 103 is formed of an n-type semiconductor, it is desirable that an energy difference between the Fermi level of the first conductive layer 102 and the vacuum level is smaller than an energy difference between the Fermi level of the first semiconductor photocatalyst layer 103 and the vacuum level. In order to achieve such a relationship, it is desirable that the first conductive layer 102 is formed of a metal having a small work function. An example of the metal having a small work function is Al, Ti, V, Zr, Nb or Ta, as described above.

The first conductive layer 102 may be formed on the substrate 101 by a vapor deposition method, a sputtering method, or a chemical vapor deposition method (hereinafter, referred to as "CVD method"). The first conductive layer 102 may serve as a barrier layer for preventing water from invading the substrate 101. In this case, since it is important that the first conductive layer 102 has high density and little pinholes or cracking, it is desirable that the sputtering method or the CVD method is employed. In light of cost, the sputtering method is desirable.

It is desirable that the first semiconductor photocatalyst layer 103 is formed of a semiconductor photocatalyst material capable of forming an ohmic contact between the first conductive layer 102 and the first semiconductor photocatalyst layer 103. Specifically, it is desirable that the first semiconductor photocatalyst layer 103 is formed of at least one compound selected from the group consisting of an oxide, a nitride, and an oxynitride. This compound includes at least one element selected from the group consisting of Ti, Nb, and Ta. When the photo-semiconductor electrode 100 is used for water splitting using sunlight as a light source, the oxidation-reduction potential of water is required to be included in the band structure of the selected semiconductor photocatalyst material. A semiconductor photocatalyst material which satisfies this condition and which has a smaller bandgap can absorb a larger amount of sunlight. Such a semiconductor photocatalyst material allows a larger amount of photo-excited electrons and holes to be generated in the water-splitting reaction. Specifically, an example of the material of the first semiconductor photocatalyst layer 103 is $TiO_2$, $Nb_2O_5$, $Ta_2O_5$, NbON, TaON, $CaNbO_2N$, $SrNbO_2N$, $BaTaO_2N$, $LaTiO_2N$, $Nb_3N_5$, or $Ta_3N_5$. Among others, an oxynitride and a nitride containing at least one of Nb and Ta have a smaller bandgap than the oxide thereof. Furthermore, such oxynitride and nitride can absorb light having a wider wavelength range than the oxide thereof.

The first semiconductor photocatalyst layer 103 may be formed of one layer of the semiconductor photocatalyst material. Alternatively, the first semiconductor photocatalyst layer 103 may have a multilayer structure where a plurality of layers formed of different semiconductor photocatalyst materials are stacked. When the first semiconductor photocatalyst layer 103 has a multilayered structure, the layer configuration is optimized to form a band bending suitable for efficient charge separation of the generated electrons and holes. As a result, the probability of the recombination is decreased to improve the efficiency of the photo-semiconductor electrode 100. Hereinafter, the case where the first semiconductor photocatalyst layer 103 comprises a first semiconductor layer and a second semiconductor layer will be described as one example. The first semiconductor layer is interposed between the second semiconductor layer and the first conductive layer 102. If both the first semiconductor layer and the second semiconductor layer are of n-type, it is desirable that all of the following four relationships (i)-(iv) are satisfied:

(i) the energy difference between the Fermi level of the first conductive layer and the vacuum level is smaller than the energy difference between the Fermi level of the first semiconductor layer and the vacuum level;

(ii) the energy difference between the Fermi level of the first semiconductor layer and the vacuum level is smaller than the energy difference between the Fermi level of the second semiconductor layer and the vacuum level;

(iii) the energy difference between the top of the valence band of the first semiconductor layer and the vacuum level is greater than the energy difference between the top of the valence band of the second semiconductor layer and the vacuum level; and (iv) the energy difference between the bottom of the conduction band of the first semiconductor layer and the vacuum level is greater than the energy difference between the bottom of the conduction band of the second semiconductor layer and the vacuum level.

If both the first semiconductor layer and the second semiconductor layer are of p-type, it is desirable that all of the following four relationships (i)-(iv) are satisfied:

(i) the energy difference between the Fermi level of the first conductive layer and the vacuum level is greater than the energy difference between the Fermi level of the first semiconductor layer and the vacuum level;

(ii) the energy difference between the Fermi level of the first semiconductor layer and the vacuum level is greater than the energy difference between the Fermi level of the second semiconductor layer and the vacuum level;

(iii) the energy difference between the top of the valence band of the first semiconductor layer and the vacuum level is smaller than the energy difference between the top of the valence band of the second semiconductor layer and the vacuum level; and (iv) the energy difference between the bottom of the conduction band of the first semiconductor layer and the vacuum level is smaller than the energy difference between the bottom of the conduction band of the second semiconductor layer and the vacuum level.

Next, the photo-semiconductor electrode 100 shown in FIG. 2 will be described. In the photo-semiconductor electrode 200 shown in FIG. 2, the first semiconductor photocatalyst layer 103 is positioned on the first principal plane 101a of the substrate 101 having the whole of the surface coated with a metal film 201. A part of the metal film 201 located between the first semiconductor photocatalyst layer 103 and the substrate 101 functions similarly to the first conductive layer 102. The metal film 201 may be formed similarly to the case of the first conductive layer 102. The other part of the metal film 201 functions as a waterproof film which prevents water from invading the substrate 101. In other words, the photo-semiconductor electrode 200 comprises the first conductive layer and the waterproof film. The whole of the surface of the substrate 101 is completely coated with the first conductive layer 102 and the waterproof film. The first conductive layer 102 is interposed between the substrate 101 and the first semiconductor photocatalyst layer 103; however, the waterproof film is not interposed therebetween. The waterproof film is formed of the same material as the first conductive layer.

Since the whole of the surface of the substrate 101 is completely coated with the metal film 201, the substrate 101 is not in contact with the liquid 93 in the operation of the photo-semiconductor electrode 200. For this reason, the substrate 101 is prevented from absorbing the water contained in the liquid 93 and from expanding. As just described, the metal film 201 functions as a barrier layer for preventing water from invading the substrate 101. In this way, since the part of the metal film 201 which functions as the first conductive layer 102 is prevented from being peeled off from the substrate 101, the performance of the photo-semiconductor electrode 200 is maintained in the liquid 93 for a long time.

The whole of the surface of the substrate 101 is coated with a metal film having a single composition. For this reason, a process for coating the part of the surface of the substrate 101 with the metal film to form the first conductive layer 102 is substituted with a process for coating the whole of the surface of the substrate 101 with the metal film, thereby enabling the fabrication of the photo-semiconductor electrode 200 without adding an additional step. In this way, since the barrier layer is formed on the substrate 101 at low cost, not only the long-time stability of the photo-semiconductor electrode 200 but also the low-cost fabrication thereof is achieved.

Next, the photo-semiconductor electrodes 300 and 400 shown in FIG. 3 and FIG. 4 will be described. In the photo-semiconductor electrode 300 shown in FIG. 3, a part of the surface of the substrate 101 which is not in contact with the first conductive layer 102 is coated with a waterproof film 301. The part of the surface of the substrate 101 which is not in contact with the first conductive layer 102 is composed of the lateral surfaces of the substrate 101 and the second principal plane 101b on which the first conductive layer 102 is not formed. In the photo-semiconductor electrode 400 shown in FIG. 4, the whole of the surface of the substrate 101 is coated with a waterproof film 401. The first conductive layer 102 is formed on or above the waterproof film 401. In other words, a part of the waterproof film 401 is interposed between the first conductive layer 102 and the substrate 101. An example of the material of the waterproof films 301 and 401 is an inorganic material such as $SiO_2$ or an organic material such as an acrylic resin or a silicone resin.

Figure 5:
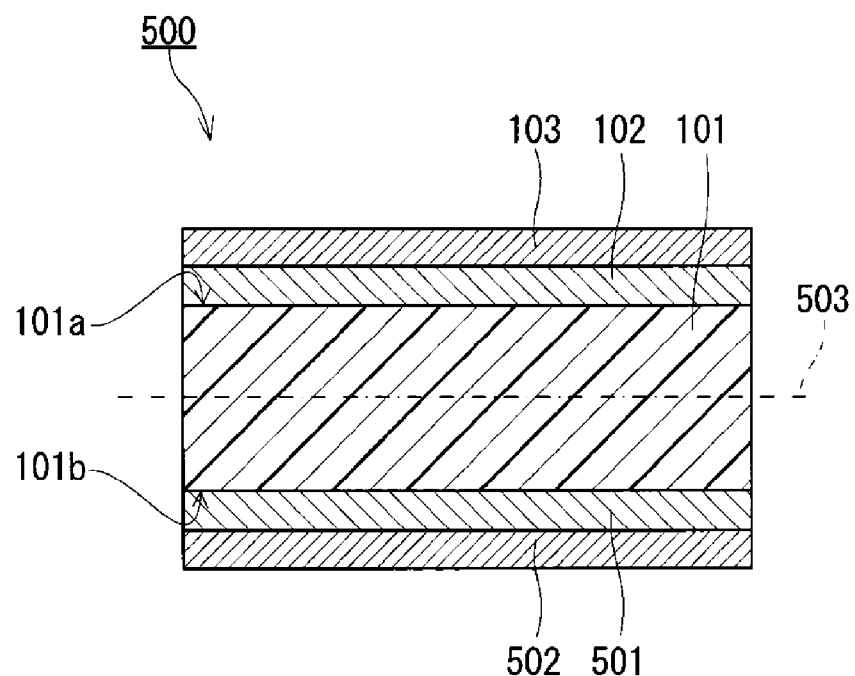
FIG. 5 shows a cross-sectional view of the photo-semiconductor electrode which can be used in the first embodiment.

Next, the photo-semiconductor electrode 500 shown in FIG. 5 will be described. The photo-semiconductor electrode 500 shown in FIG. 5 further comprises a second conductive layer 501 and a second semiconductor photocatalyst layer 502. The second conductive layer 501 is formed on or above the second principal plane 101b. The second conductive layer 501 is interposed between the substrate 101 and the second semiconductor photocatalyst layer 502. In this way, the photo-semiconductor electrode 500 comprises the first semiconductor photocatalyst layer 103 on the front surface thereof and comprises the second semiconductor photocatalyst layer 502 on the back surface thereof. In the photo-semiconductor electrode 500 shown in FIG. 5, utilized is not only the light incident on the front surface of the photo-semiconductor electrode 500 but also the light incident on the back surface thereof. Specifically, when the first semiconductor photocatalyst layer 103 faces a light source such as the sun, reflected light or scattered light incident on the second semiconductor photocatalyst layer 502 is utilized. As a result, this allows a larger amount of hydrogen to be generated.

The first conductive layer 102 and the second conductive layer 501 are symmetrical with each other with respect to a standard plane 503. The standard plane 503 is located at the center of the thickness direction of the substrate 101 and is parallel to the surface of the substrate 101. The second semiconductor photocatalyst layer 502 and the first semiconductor photocatalyst layer 103 are also symmetrical with each other with respect to the standard plane 503. The substrate 101 may absorb water contained in the liquid 93 to expand. As a result, the deformation degree on the front surface of the photo-semiconductor electrode 500 is comparable to the deformation degree on the back surface thereof, even when the photo-semiconductor electrode 500 is deformed. For this reason, the photo-semiconductor electrode 500 is prevented from being deformed largely. In this way, the further long-time stability of the photo-semiconductor electrode 500 is realized.

The second conductive layer 501 is formed of the same material as the first conductive layer 102. This allows the difference of the deformation degree between the front and back surfaces of the photo-semiconductor electrode 500 to be decreased. The second conductive layer 501 may be formed in a similar way to the case of the first conductive layer 102.

The second semiconductor photocatalyst layer 502 is formed of the same material as the first semiconductor photocatalyst layer 103. This also allows the difference of the deformation degree between the front and back surfaces of the photo-semiconductor electrode 500 to be decreased. The second semiconductor photocatalyst layer 502 may be formed in a similar way to the case of the first semiconductor photocatalyst layer 103.

Figure 2:
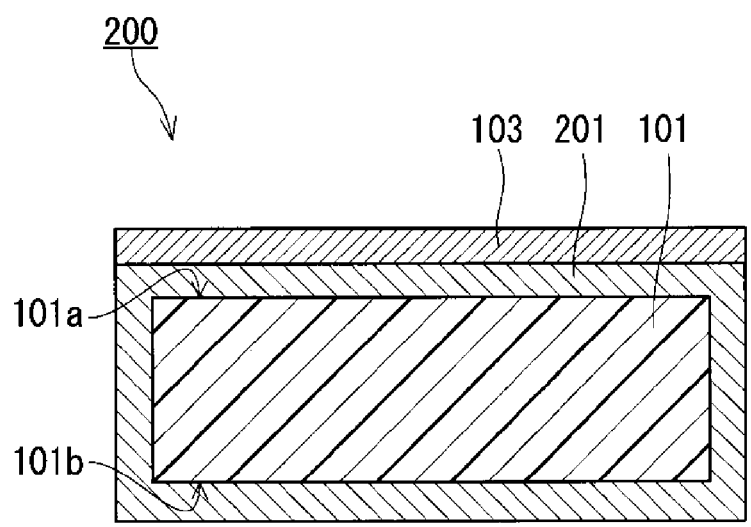
FIG. 2 shows a cross-sectional view of the photo-semiconductor electrode which can be used in the first embodiment.
Figure 3:
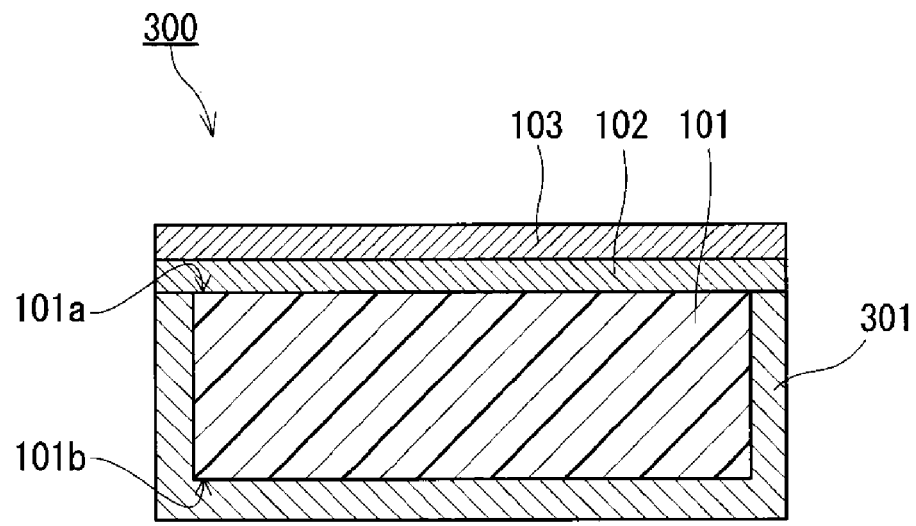
FIG. 3 shows a cross-sectional view of the photo-semiconductor electrode which can be used in the first embodiment.
Figure 4:
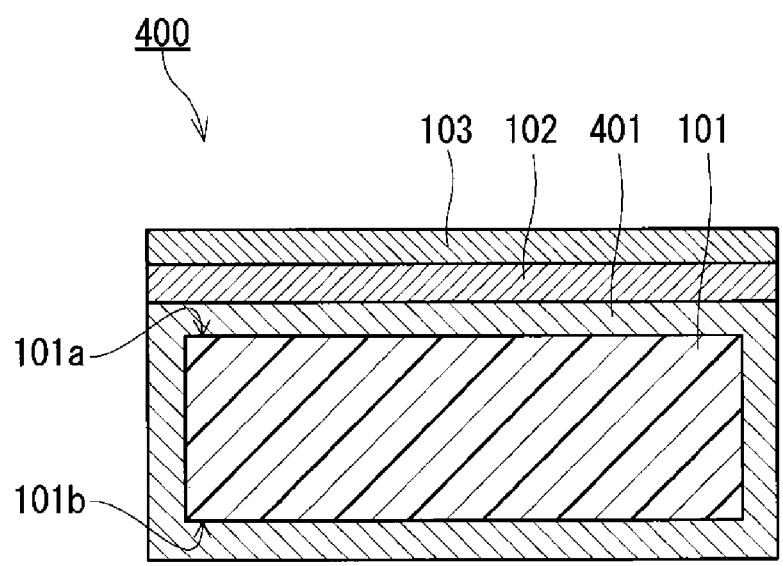
FIG. 4 shows a cross-sectional view of the photo-semiconductor electrode which can be used in the first embodiment.

The photo-semiconductor electrodes shown in FIG. 2, FIG. 3, and FIG. 4 also may comprise the second conductive layer 501 and the second semiconductor photocatalyst layer 502.

Figure 6:
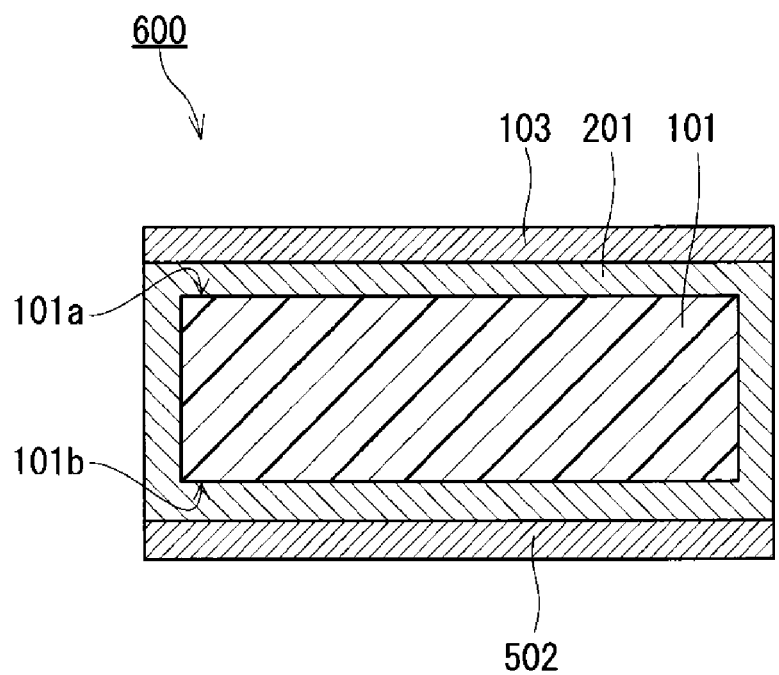
FIG. 6 shows a cross-sectional view of the photo-semiconductor electrode which can be used in the first embodiment.

Then, the photo-semiconductor electrode 600 shown in FIG. 6 will be described. The photo-semiconductor electrode 600 shown in FIG. 6 is formed by adding the second semiconductor photocatalyst layer 502 to the back surface of the photo-semiconductor electrode 200 shown in FIG. 2. Specifically, the whole of the surface of the substrate 101 is coated with the metal film 201. A front surface of the metal film 201 functions as the first conductive layer 102. A back surface of the metal film 201 is interposed between the substrate 101 and the second semiconductor photocatalyst layer 502 so as to function as the second conductive layer 501. The photo-semiconductor electrode 600 shown in FIG. 6 has both the technical effect of the photo-semiconductor electrode 200 shown in FIG. 2 and the technical effect of the photo-semiconductor electrode 500 shown in FIG. 5.

Figure 7:
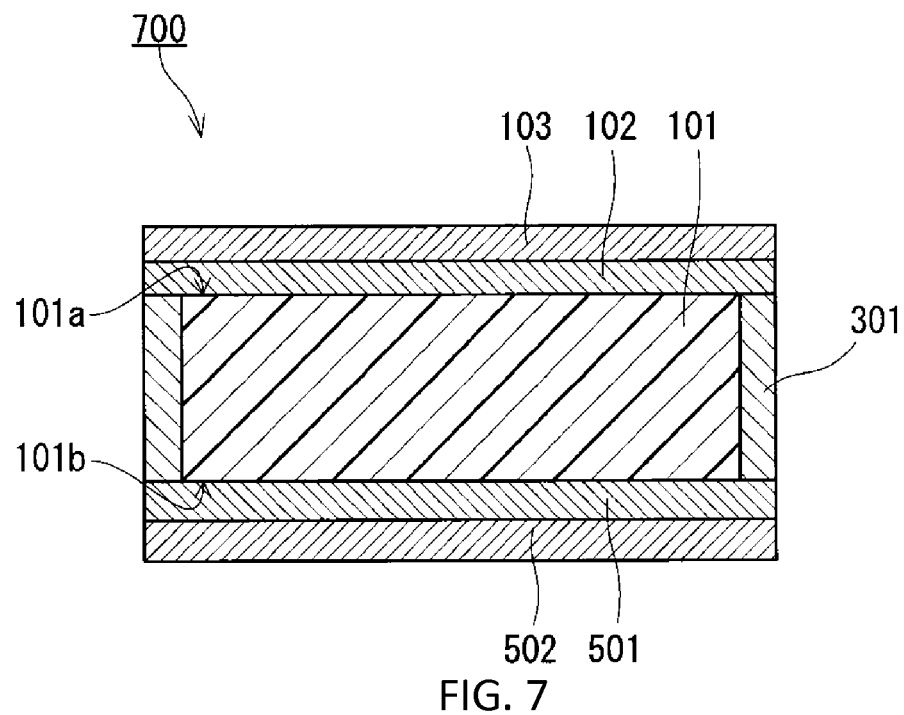
FIG. 7 shows a cross-sectional view of the photo-semiconductor electrode which can be used in the first embodiment.
Figure 8:
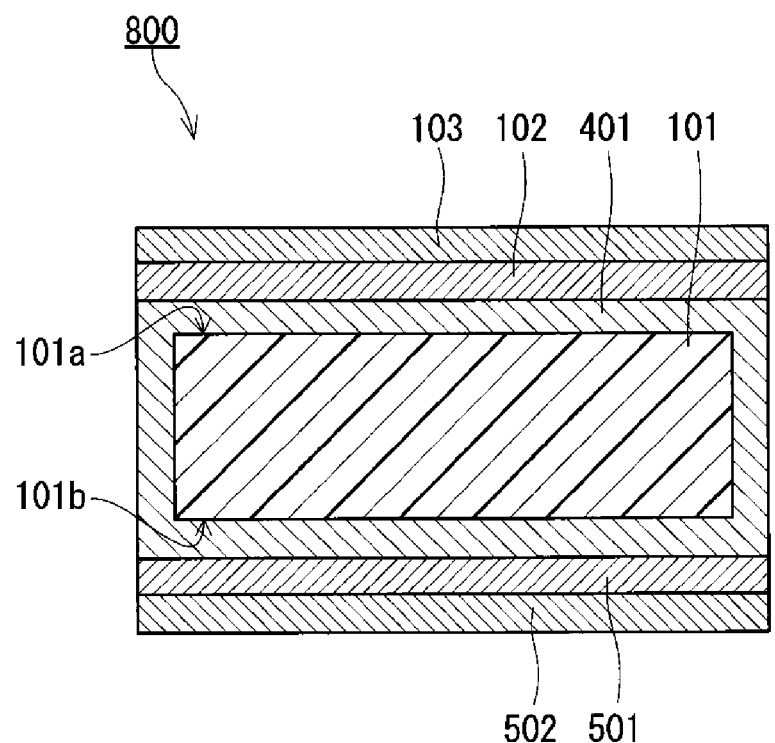
FIG. 8 shows a cross-sectional view of the photo-semiconductor electrode which can be used in the first embodiment.

Next, the photo-semiconductor electrodes 700 and 800 shown in FIG. 7 and FIG. 8 will be described. The photo-semiconductor electrode 700 shown in FIG. 7 is formed by adding the second conductive layer 501 and the second semiconductor photocatalyst layer 502 to the back surface of the photo-semiconductor electrode 300 shown in FIG. 3. The lateral sides of the substrate 101 are coated with the waterproof film 301. The photo-semiconductor electrode 700 shown in FIG. 7 has both the technical effect of the photo-semiconductor electrode 300 shown in FIG. 3 and the technical effect of the photo-semiconductor electrode 500 shown in FIG. 5. The photo-semiconductor electrode 800 shown in FIG. 8 is formed by adding the second conductive layer 501 and the second semiconductor photocatalyst layer 502 to the back surface of the photo-semiconductor electrode 400 shown in FIG. 4. The whole of the surface of the substrate 101, including the lateral sides thereof, is coated with the waterproof film 401. The photo-semiconductor electrode 800 shown in FIG. 8 has both the technical effect of the photo-semiconductor electrode 400 shown in FIG. 4 and the technical effect of the photo-semiconductor electrode 500 shown in FIG. 5.

Figure 11:
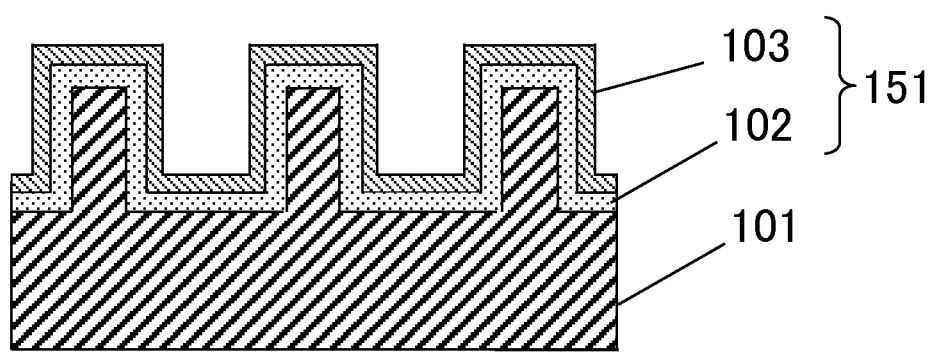
FIG. 11 shows a cross-sectional view of the photo-semiconductor electrode having a plurality of pillar protrusions on the surface thereof.

As shown in FIG. 11, the photo-semiconductor electrode 100 may comprise a plurality of pillar protrusions 151 on the surface thereof. The surface of the pillar protrusion 151 is formed of the first semiconductor photocatalyst layer 103. The plurality of pillar protrusions 151 may also be formed on the back surface of the photo-semiconductor electrode 100. The pillar protrusion 151 formed on the back surface of the photo-semiconductor electrode 100 is formed of the second semiconductor photocatalyst layer 502. Desirably, as shown in FIG. 11, a part of the first conductive layer 102 and a part of the substrate 101 are included in the inside of the pillar protrusion 151. In this case, the part of the substrate 101 included in the inside of the pillar protrusion 151 is pillar-shaped. The part of the first conductive layer 102 included in the inside of the pillar protrusion 151 is also pillar-shaped. The part of the first conductive layer 102 included in the inside of the pillar protrusion 151 is coated with the first semiconductor photocatalyst layer 103. For more detail of the photo-semiconductor electrode 100 comprising the plurality of pillar protrusions 151, see United States Patent Application Publication No. 2015/0083605, which is incorporated herein by reference.

Next, a method for fabricating the photo-semiconductor electrode 100 shown in FIG. 11 will be described below.

An example of the method for fabricating the photo-semiconductor electrode 100 shown in FIG. 11 is (i) a heat-print method, (ii) a photo-print method, or (iii) a high aspect ratio print method.

Figure 13:
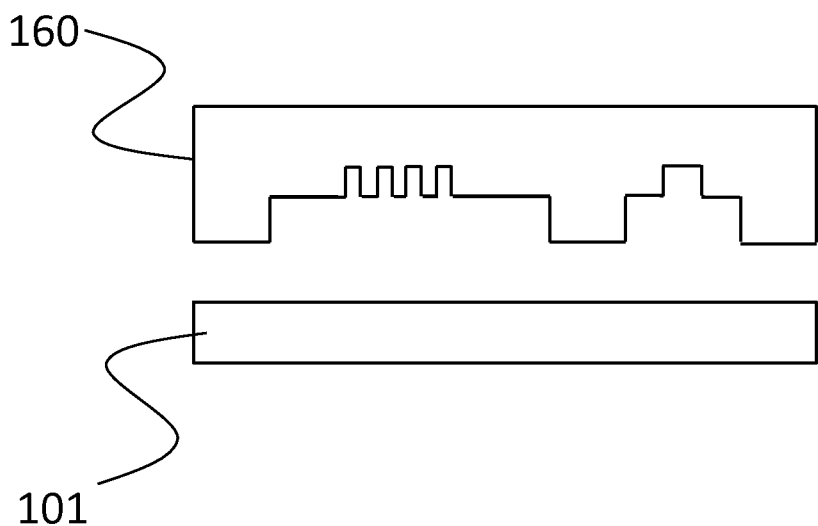
FIG. 13 shows a cross-sectional view of a heat-print method.

In the heat-print method, the substrate 101 formed of a resin is heated. Then, as shown in FIG. 13, a mold 160 is pressed onto the heated substrate 101 to deform the substrate 101. Finally, the mold 160 is removed from the substrate 101. An example of the material of the mold 160 is silicon.

Also in the photo-print method, the mold 160 is pressed onto a liquid ultraviolet curable resin. Then, the ultraviolet curable resin is irradiated with ultraviolet light to cure the resin. Finally, the mold 160 is removed from the resin to obtain a substrate formed of the resin.

Figure 14A:
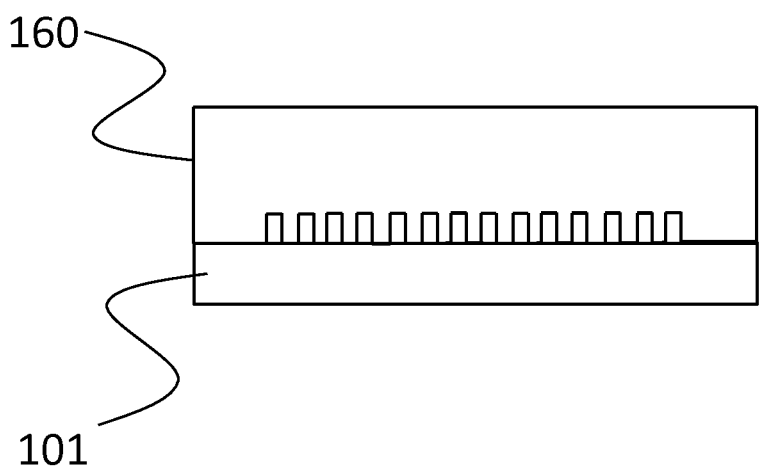
FIG. 14A shows a cross-sectional view of a first step of a high aspect ratio print method.
Figure 14B:
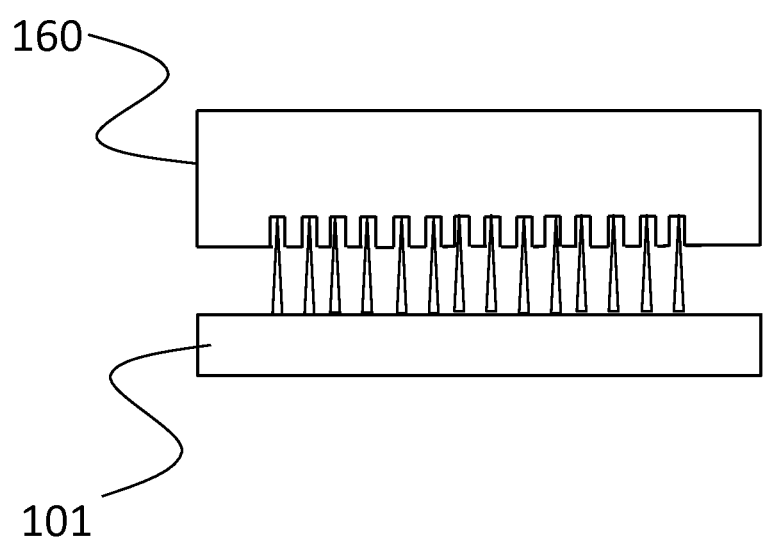
FIG. 14B shows a cross-sectional view of a second step of the high aspect ratio print method which is subsequent to the step shown in FIG. 14A.
Figure 14C:
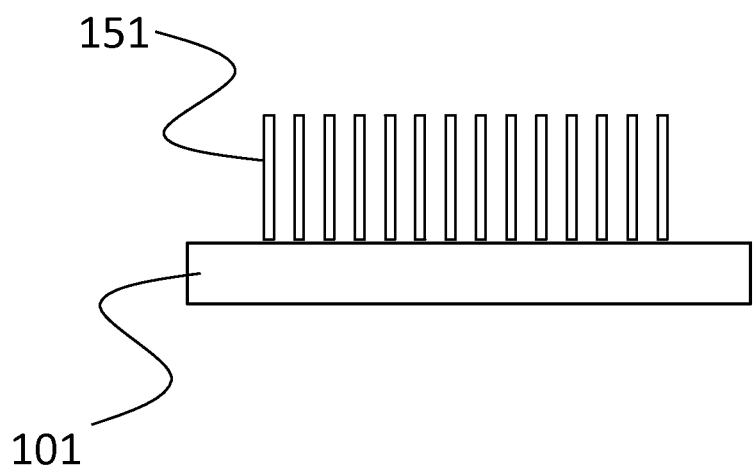
FIG. 14C shows a cross-sectional view of a substrate comprising a plurality of pillar protrusions formed by the high aspect ratio print method.

In the high aspect ratio print method, the substrate 101 formed of a resin is heated. Then, the mold 160 is pressed onto the heated substrate 101 as shown in FIG. 14A. The resin heated on the surface of the substrate 101 flows into the cavity formed on the surface of the mold 160. Then, as shown in FIG. 14B, the mold 160 is detached from the substrate 101 in such a manner that the resin which has flowed into the cavity is drawn and extended by the mold 160. In this way, pillar protrusions shown in FIG. 14C are formed on the surface of the substrate 101.

Next, a conductive material is formed on the substrate 101 having the pillar protrusions on the surface thereof by a vapor deposition method or a sputtering method to form the first conductive layer 102. Finally, a photocatalyst material is formed on the first conductive layer 102 by a reactive sputtering method, a metalorganic chemical vapor deposition method, or an atomic layer deposition method. In this way, the photo-semiconductor electrode 100 comprising the plurality of pillar protrusions 151 on the surface thereof as shown in FIG. 11 is provided.

Next, the operation of the hydrogen generation device 900 will be described below.

Figure 10:
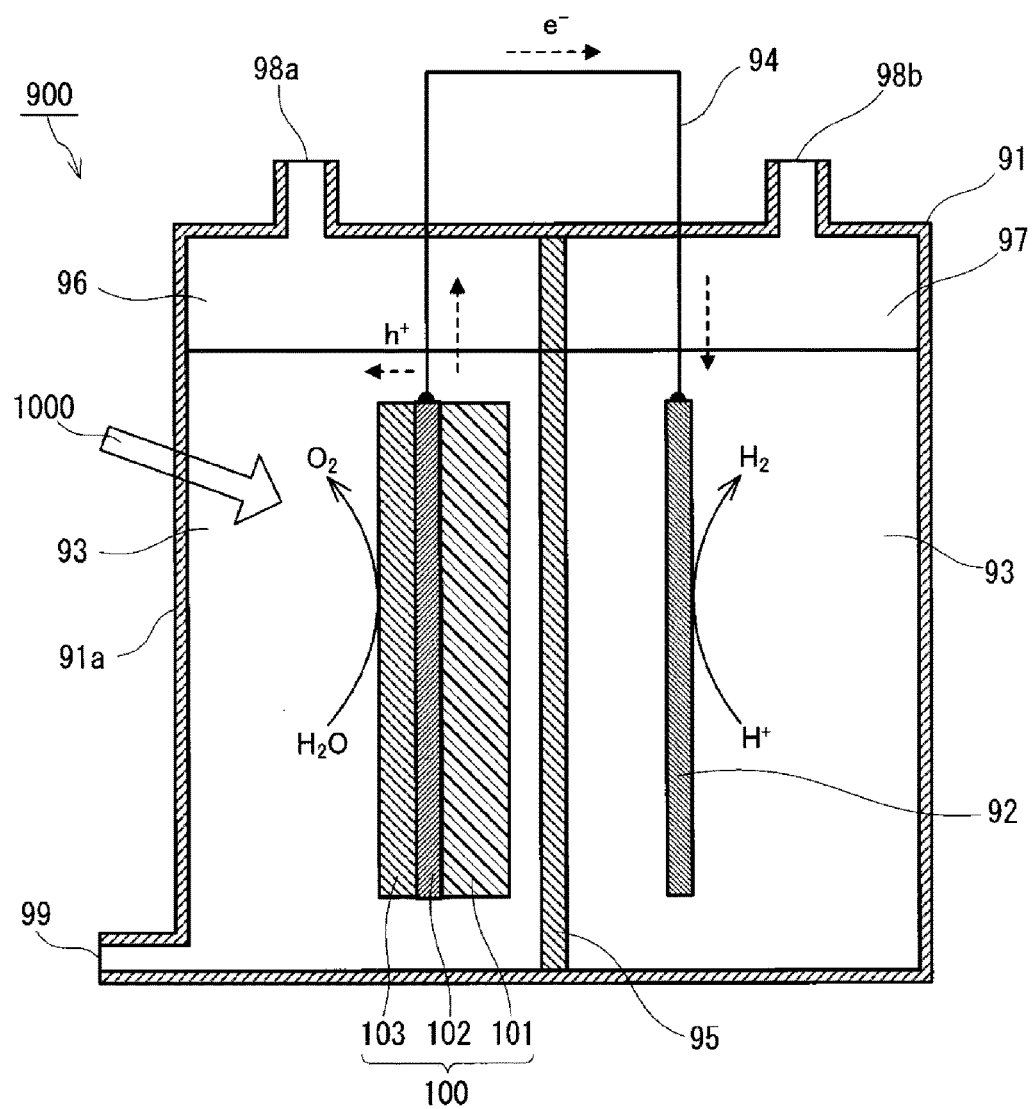
FIG. 10 shows a cross-sectional view of the hydrogen generation device in operation.

As shown in FIG. 10, the first semiconductor photocatalyst layer 103 is irradiated with light 1000 such as sunlight through the light-transmissive part 91*a*. When the first semiconductor photocatalyst layer 103 is of n-type, electrons and holes are generated respectively in the conduction band and in the valence band of the part of the first semiconductor photocatalyst layer 103 which has been irradiated with the light 1000. The holes thus generated migrate near the surface of the first semiconductor photocatalyst layer 103. In this way, water is split on the surface of the first semiconductor photocatalyst layer 103 through the chemical reaction represented by the following chemical formula (I) to generate oxygen.

$$4h^+ + 2H_2O \rightarrow O_2\uparrow + 4H^+ \quad (I)$$

On the other hand, the electrons migrate along the band bending of the conduction band of the first semiconductor photocatalyst layer 103 to the first conductive layer 102. The electrons which have reached the first conductive layer 102 transfer to the counter electrode 92 through the conductive wire 94. In this way, hydrogen is generated on the surface of the counter electrode 92 through the chemical reaction represented by the following chemical formula (II).

$$4e^- + 4H^+ \rightarrow 2H_2\uparrow \quad (II)$$

As shown in FIG. 10, the first semiconductor photocatalyst layer 103 is irradiated with the light 1000. A part of the light 1000 incident on the first semiconductor photocatalyst layer 103 penetrates the first semiconductor photocatalyst layer 103 to reach the surface of the first conductive layer 102. Since the first conductive layer 102 is formed of a metal, this light is reflected off or scattered on the surface of the first conductive layer 102. For this reason, the substrate 101 formed of the resin is not irradiated with the light 1000. In this way, the substrate 101 formed of the resin is prevented from being deteriorated. Unlike a substrate formed of an inorganic material such as glass, a metal, or a metal compound, a substrate formed of a resin has low resistance against light; however, the substrate 101 formed of the resin is protected from light in the present invention. Therefore, the long-time stability of the substrate 101 formed of the resin is achieved. As just described, the light is incident on the first semiconductor photocatalyst layer 103. However, since the first conductive layer 102 is light-blocking, the light does not reach the substrate 101.

As shown in FIG. 5-FIG. 8, in the case where both of the surfaces of the substrate 101 formed of the resin are coated with the metal, the back surface of the substrate 101 formed of the resin is not irradiated with the light such as the scattered light or the reflected light generated in the liquid 93. For this reason, the substrates 101 in the photo-semiconductor electrodes shown in FIG. 5-FIG. 8 are prevented efficiently from being deteriorated, compared to those in the photo-semiconductor electrodes shown in FIG. 1-FIG. 4.

As shown in FIG. 2, FIG. 3, FIG. 4, FIG. 6, FIG. 7, and FIG. 8, in the case where the whole of the surface of the substrate 101 formed of the resin is coated with the waterproof film, the substrate 101 formed of the resin included in the photo-semiconductor electrode immersed in the liquid 93 is prevented from being eroded by the liquid 93. Unlike the substrate formed of an inorganic material, the substrate formed of the resin has low resistance against liquid; however, the substrate 101 formed of the resin included in the photo-semiconductor electrode comprising the waterproof film is protected not only from light but also from liquid.

INDUSTRIAL APPLICABILITY

Hydrogen generated by the method according to the present invention can be supplied to a fuel cell which generates heat and electric energy through a chemical reaction of hydrogen and oxygen.

REFERENTIAL SIGNS LIST

100: Photo-semiconductor electrode
101: Substrate formed of resin
102: First conductive layer
103: First semiconductor photocatalyst layer
200: Photo-semiconductor electrode
201: Metal film
300: Photo-semiconductor electrode
301: Waterproof film
400: Photo-semiconductor electrode
401: Waterproof film
500: Photo-semiconductor electrode
501: Second conductive layer
502: Second semiconductor photocatalyst layer
503: Standard plane
600: Photo-semiconductor electrode
700: Photo-semiconductor electrode
800: Photo-semiconductor electrode
900: Hydrogen generation device
91: Container
91a: light-transmissive part
92: Counter electrode
93: Liquid
94: Conductive wire
95: Separator
96: First chamber
97: Second chamber
98a: First outlet
98b: Second outlet
99: Water supply inlet

The invention claimed is:

1. A method for generating hydrogen, the method comprising:
    (a) preparing a hydrogen generation device comprising:
        a container;
        a photo-semiconductor electrode comprising a substrate, a light-blocking first conductive layer, and a first semiconductor photocatalyst layer;
        a counter electrode;
        a conductive wire for electrically connecting the first conductive layer to the counter electrode; and
        a liquid stored in the container,
    wherein
        the first conductive layer is interposed between the substrate and the first semiconductor photocatalyst layer,
        at least a part of the first semiconductor photocatalyst layer is in contact with the liquid,
        at least a part of the counter electrode is in contact with the liquid,
        the liquid is selected from the group consisting of an electrolyte aqueous solution and water,
        the substrate is formed of a resin,
        the substrate has a thickness of not less than 0.1 millimeter and not more than 5 millimeters,
        a front surface, a back surface and a lateral surface of the surface of the substrate are coated with a metal film, and
        a part of the metal film located between the first semiconductor photocatalyst layer and the front surface of the substrate serves as the first conductive layer; and
    (b) irradiating the first semiconductor photocatalyst layer with light to generate hydrogen on the counter electrode.

2. The method according to claim 1, wherein the first conductive layer has a thickness of not less than 0.01 micrometer and not more than 1 micrometer.

3. The method according to claim 1, wherein
the first conductive layer includes at least one element selected from the group consisting of Al, Ti, V, Zr, Nb and Ta.

4. The method according to claim 1, wherein
the substrate has a first principal plane and a second principal plane;
the first conductive layer is formed on the first principal surface in such a manner that the first principal plane is interposed between the substrate and the first conductive layer; and
a lateral surface of the substrate and the second principal plane are coated by a waterproof film.

5. The method according to claim 4, wherein
the waterproof film has a thickness of not less than 0.1 micrometer and not more than 100 micrometers.

6. The method according to claim 1, wherein
a whole of a surface of the substrate is coated by a waterproof film; and
the first conductive layer is formed on the waterproof film in such a manner that a part of the waterproof film is interposed between the first conductive layer and the substrate.

7. The method according to claim 6, wherein
the waterproof film has a thickness of not less than 0.1 micrometer and not more than 100 micrometers.

8. The method according to claim 1, wherein
the metal film has a thickness of not less than 0.1 micrometer and not more than 100 micrometers.

9. The method according to claim 1, wherein
the first semiconductor photocatalyst layer is formed of at least one compound selected from the group consisting of an oxide, a nitride, and an oxynitride; and
the compound includes at least one element selected from the group consisting of Ti, Nb, and Ta.

10. The method according to claim 1, wherein
the photo-semiconductor electrode further comprises a second conductive layer and a second semiconductor photocatalyst layer;
the substrate is interposed between the first conductive layer and the second conductive layer; and
the second conductive layer is interposed between the substrate and the second semiconductor photocatalyst layer.

11. The method according to claim 10, wherein
the second conductive layer and the first conductive layer are symmetrical with each other with respect to a standard plane;
the second semiconductor photocatalyst layer and the first semiconductor photocatalyst layer are symmetrical with each other with respect to the standard plane; and
the standard plane is positioned at a center of a thickness direction of the substrate and is parallel to a surface of the substrate.

12. The method according to claim 10, wherein
the second semiconductor photocatalyst layer is formed of the same material as the first semiconductor photocatalyst layer.

13. The method according to claim 10, wherein
the second conductive layer is formed of the same material as the first conductive layer.

14. The method according to claim 1, wherein
the photo-semiconductor electrode comprises a plurality of pillar protrusions on the surface thereof; and
a surface of each of the pillar protrusions is formed of the first semiconductor photocatalyst layer.

15. The method according to claim 14, wherein
a part of the substrate and a part of the first conductive layer are included in the inside of each of the pillar protrusions;
the part of the substrate included in the inside of each of the pillar protrusions is pillar-shaped;
the part of the substrate included in the inside of the pillar protrusion is coated with the part of the first conductive layer included in the inside of the pillar protrusion; and
the part of the first conductive layer included in the inside of the pillar protrusion is coated with the first semiconductor photocatalyst layer formed on the surface of the pillar protrusion.

16. The method according to claim 1, wherein
a material of the resin is polyethylene, polypropylene, polyvinyl chloride, polystyrene, polymethyl methacrylate, polyamide, polycarbonate, polybutylene terephthalate, or polyethylene terephthalate.

17. A hydrogen generation device comprising:
a container;
a photo-semiconductor electrode comprising a substrate, a light-blocking first conductive layer, and a first semiconductor photocatalyst layer;
a counter electrode; and
a conductive wire for electrically connecting the first conductive layer to the counter electrode, wherein:
the first conductive layer is interposed between the substrate and the first semiconductor photocatalyst layer,
the substrate is formed of a resin,
the substrate has a thickness of not less than 0.1 millimeter and not more than 5 millimeters, and
a front surface, a back surface and a lateral surface of the surface of the substrate are coated with a metal film, and
a part of the metal film located between the first semiconductor photocatalyst layer and the front surface of the substrate serves as the first conductive layer.

18. The hydrogen generation device according to claim 17, wherein
a material of the resin is polyethylene, polypropylene, polyvinyl chloride, polystyrene, polymethyl methacrylate, polyamide, polycarbonate, polybutylene terephthalate, or polyethylene terephthalate.

19. A method for generating hydrogen, the method comprising:
(a) preparing a hydrogen generation device comprising:
a container;
a photo-semiconductor electrode comprising a substrate, a light-blocking first conductive layer, and a first semiconductor photocatalyst layer;
a counter electrode;
a conductive wire for electrically connecting the first conductive layer to the counter electrode; and
a liquid stored in the container,
wherein
the first conductive layer is interposed between the substrate and the first semiconductor photocatalyst layer,
at least a part of the first semiconductor photocatalyst layer is in contact with the liquid,
at least a part of the counter electrode is in contact with the liquid,
the liquid is selected from the group consisting of an electrolyte aqueous solution and water,
the substrate is formed of a resin,
the substrate has a thickness of not less than 0.1 millimeter and not more than 5 millimeters, the substrate has a first principal plane and a second principal plane, the first conductive layer is formed on the first principal surface in such a manner that the first principal plane is interposed between the substrate and the first conductive layer, and a lateral surface of the substrate and the second principal plane are coated by a waterproof film; and (b) irradiating the first semiconductor photocatalyst layer with light to generate hydrogen on the counter electrode.

* * * * *

UNITED STATES PATENT AND TRADEMARK OFFICE
CERTIFICATE OF CORRECTION

PATENT NO. : 10,047,444 B2
APPLICATION NO. : 14/810201
DATED : August 14, 2018
INVENTOR(S) : Satoru Tamura Page 1 of 1

It is certified that error appears in the above-identified patent and that said Letters Patent is hereby corrected as shown below:

On the Title Page

Under (73) Assignee, please change "Panasonic Intellectual Property Management Co., Ltd., Osaka (JP)" to:
PANASONIC CORPORATION, Osaka (JP)

Signed and Sealed this
Sixteenth Day of October, 2018

Andrei Iancu
*Director of the United States Patent and Trademark Office*